May 19, 1970   J. J. MOROCCO   3,512,671
SIDE SHIFTED LIFT TRUCK CARRIAGE
Filed Jan. 12, 1968
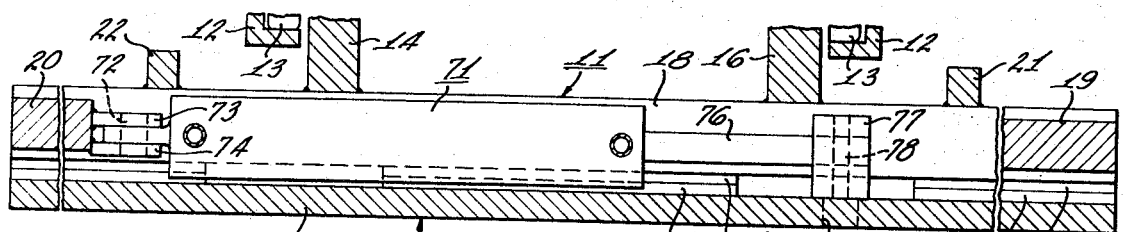
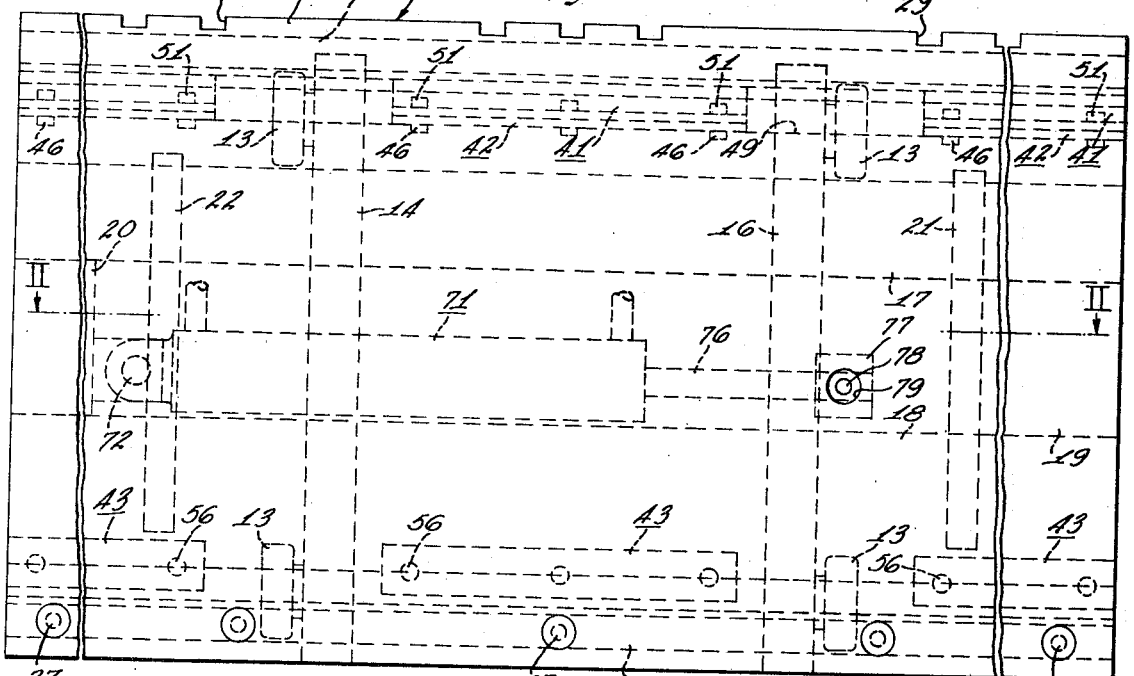
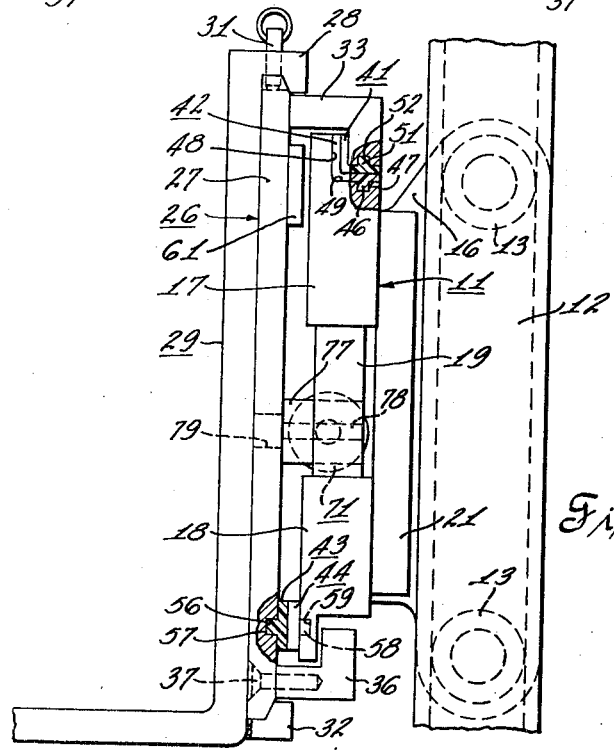
Inventor
Joseph J. Morocco
By Charles C. Schwarz
Attorneys

United States Patent Office 3,512,671
Patented May 19, 1970

3,512,671
SIDE SHIFTED LIFT TRUCK CARRIAGE
Joseph J. Morocco, Chicago, Ill., assignor to Allis-Chalmers Manufacturing Company, Milwaukee, Wis.
Filed Jan. 12, 1968, Ser. No. 697,523
Int. Cl. B66f 9/14
U.S. Cl. 214—730                 1 Claim

ABSTRACT OF THE DISCLOSURE

A side shift carriage having upper and lower sets of plastic bearing angles and strips with retaining lugs integrally formed therewith.

---

This invention relates to a side shift carriage having improved means for guiding the carriage during side shifting movement.

Heretofore others have provided side shift carriages, however these have not proven entirely satisfactory in all respects. Some prior art side shift carriages extend the load center excessively far forward of the lift truck mast. Other side shift carriages require an excessive amount of routine servicing, such as lubrication. Still further disadvantages of prior art side shifters are excessive cost and frequency of repair.

It is an object of this invention to provide an improved side shift carriage which does not require lubrication of guide members.

It is a further object to this invention to provide an improved side shift carriage wherein the addition of the side shift feature to the lift truck does not extend the load center forwardly an excessive amount.

It is a further object of this invention to provide improve guide means for a side shift carriage which are inexpensive, self-lubricating and give long trouble free service.

It is a further object of this invention to provide an improved side shift mechanism for a lift truck utilizing one piece molded plastic bearing members with retaining lugs.

These and other objects and advantages of this invention will be apparent when the following description is read in conjunction with the drawings in which:

FIG. 1 is a front view of a side shift carriage mechanism in which the present invention is incorporated;

FIG. 2 is an end view of the side shift mechanism shown in FIG. 1; and

FIG. 3 is a section view taken along the line II—II in FIG. 1.

Referring to the drawings a horizontally stationary and vertically shiftable carriage 11 is mounted on a lift truck mast 12 by four rollers 13 rotatably mounted on rearwardly extending plates 14, 16. Plates 14, 16 are welded to the rear side of upper and lower horizontal guide portions of carriage 11 which take the form of a pair of laterally extending parallel guide plates 17, 18. The guide plates 17, 18 are secured to one another by tie members 19, 20 and braces 21, 22.

A second carriage 26 is slidably supported on the first carriage 11 for lateral shifting movement relative thereto. The second carriage includes a vertically disposed and laterally extending plate member 27 which is adapted at its top end to receive a hook portion 28 of a lift fork 29. The top part of the plate 27 presents notches 29 for receiving a suitably locking pin 31 extending through the hook part 28 of fork 29. The bottom part of the plate 27 is likewise adapted to cooperate with a hook part 32 on the bottom rear of the fork 29. An L-section part 33 has its horizontal leg secured as by welding to the upper rear of plate 27 and is coextensive in length with the lateral dimension plate 27. Thus the L-section part 33 not only serves as a part of the guide mechanism, as will hereinafter be described, but also serves as a brace and strengthening member for the plate 27. Similarly a lower L-section hanger bar part 36 is secured by cap screws 37 to the bottom rear of the plate 27.

Upper and lower guide means are provided for slidably mounting the shiftable carriage 26 on the horizontally stationary carriage 11 including three sets of bearing angles 41, 42 and three sets of bearing strips 43, 44. The bearing angle 42 includes a downwardly extending lug portion 46 which extends into a suitable pocket 47 formed in an upper guide portion of the carriage 11. The outside surfaces of the angle 42 are in load bearing relation to a vertical surface 48 on plate 17 and in load bearing relation to a horizontal surface 49 also formed on plate 17 at a right angle to surface 48. The angle 41 includes a mounting lug 51 which fits in a pocket 52 formed in the part 33. The angle 41 is disposed in vertical and horizontal load bearing relation to the downwardly extending leg of the L-section part 33. The outward surfaces of angle 41 are in load bearing engagement with the inward surfaces of angle 42. The angles 41, 42 and bearing strips 43, 44 are made of self-lubricating plastic material and are molded in one piece, that is the lug is integrally formed with the remainder of the angle or strip. The bearing angle 42 and bearing strip 44 which are mounted on the carriage 11 are preferably formed of nylon material. The angle 41 and strip 43 on the side shift carriage 26 are preferably formed of acetal resin. The strip 43 includes a lug portion 56 which fits within a suitable pocket 57 in the lower rear of plate 27 and strip 44 includes a lug 58 positioned in a pocket 59 formed in the lower part of the carriage 11. The horizontal clearance between the hanger bar 36 and the lower end of the carriage 11 is less than the length of the lugs 56, 58. Thus once installed the bearing strips 43, 44 will be maintained in place. A suitable wear strip 61 is welded to the back side of the plate 27.

Actuating means in the form of a double acting hydraulic jack 71 is provided between the carriages for side shifting the second carriage 26 relative to the first carriage 11. The cylinder end of the jack 71 is secured by a pin 72 to brackets 73, 74 welded to tie member 20. The rod 76 of jack 71 is connected to a mounting block 77 welded to plate 27 by a pin 78. A suitable opening 79 is provided in the plate 27 to facilitate installation and removal of pin 78.

As illustrated, the sets or pairs of bearing angles 41, 42 and strips, 44 do not cover the entire lateral dimension of the carriage 11. It has been found that three sets of angles 42, 43 and three sets of bearing members 43, 44 provide satisfactory support with very little friction, low initial cost and long trouble free service. Since the angles 41, 42 and bearing strips 43, 44 are relatively low in cost and give good service without maintenance, a substantial economic benefit accrues to the lift truck user.

The embodiments of the invention in which an exclusive property or privilege is claimed are defined as follows:

1. A side shift carriage mechanism for a lift truck of the type having an upright mast, comprising:
   a first carriage adapted for mounting on said mast for vertical movement thereon and having parallel upper and lower horizontal guide portions disposed one above the other and each presenting a plurality of pockets,
   a second carriage adapted to receive lift forks and having upper and lower parts in confronting relation to said portions, respectively, and each presenting a plurality of pockets means mounting said second carriage on said first carriage for horizontal side shifting movement along said guide portions including:

a pair of plastic bearing angles in vertical and horizontal load bearing engagement with one another and having a plurality of lugs extending into said pockets in said upper portion and upper part, respectively, and a pair of plastic bearing strips in horizontal load bearing engagement with one another and having a plurality of lugs extending into said pockets in said lower portion and lower part, respectively, and actuating means between said carriages for side shifting said second carriage relative to said first carriage.

References Cited

UNITED STATES PATENTS

| 2,806,619 | 9/1957 | Schroeder | 214—730 |
| 3,032,377 | 5/1962 | Blase. | |
| 3,243,236 | 5/1966 | Graham | 308—3 |
| 1,702,783 | 2/1929 | Kiesling | 308—3.6 |
| 2,826,323 | 3/1958 | Schenkelberger | 214—730 |

EVAN C. BLUNK, Primary Examiner

D. WATTS, Assistant Examiner

U.S. Cl. X.R.

187—9; 214—88